Figure 1:
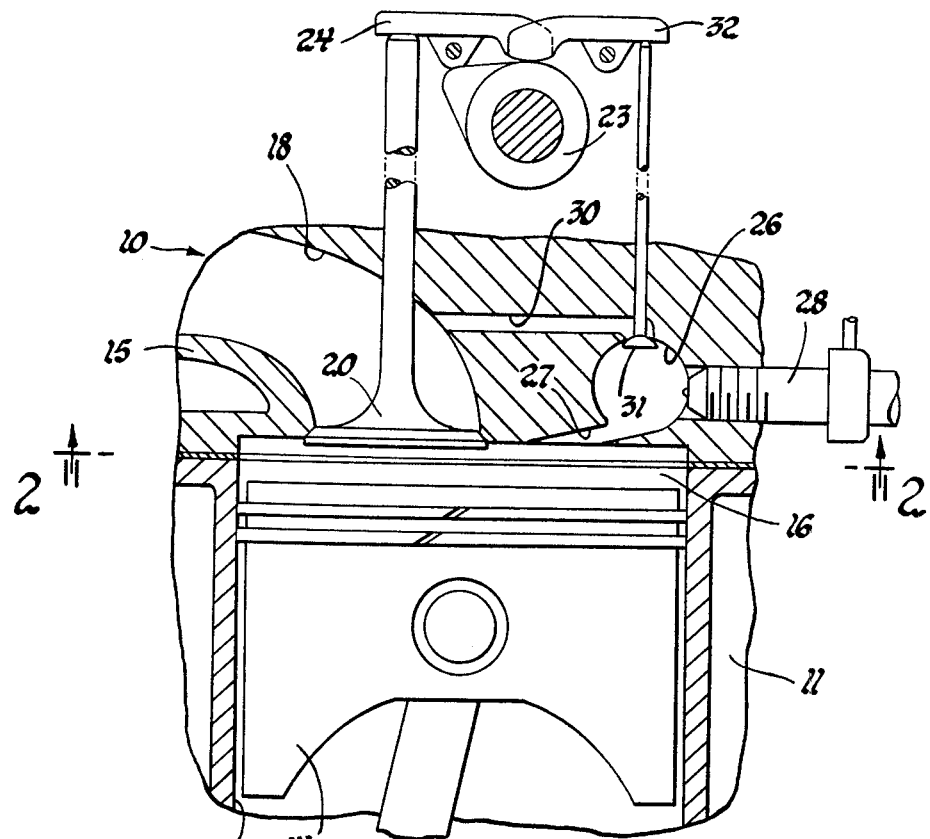

United States Patent [19]

Lancaster

[11] 4,271,810

[45] Jun. 9, 1981

[54] DIVIDED CHAMBER ENGINE WITH PRECHAMBER EXHAUST RECIRCULATION

[75] Inventor: David R. Lancaster, Troy, Mich.

[73] Assignee: General Motors Corporation, Detroit, Mich.

[21] Appl. No.: 111,211

[22] Filed: Jan. 11, 1980

[51] Int. Cl.[3] .......................................... F02M 25/06
[52] U.S. Cl. .................................. 123/568; 123/569; 123/258; 123/432; 123/302; 123/275
[58] Field of Search ............... 123/569, 568, 571, 302, 123/275, 258, 432

[56] References Cited

U.S. PATENT DOCUMENTS

| | | | |
|---|---|---|---|
| 1,710,365 | 4/1929 | Leonard | 123/569 |
| 2,316,618 | 4/1943 | Pyatt | 123/432 |
| 3,809,039 | 5/1974 | Alquist | 123/568 |
| 3,875,914 | 4/1975 | Villella | 123/568 |
| 3,930,471 | 1/1976 | Leonard et al. | 123/258 |
| 3,941,105 | 3/1976 | Yagi et al. | 123/568 |
| 3,982,514 | 9/1976 | Turns et al. | 123/568 |
| 3,993,037 | 11/1976 | Mukai et al. | 123/263 |
| 4,020,808 | 5/1977 | Yagi et al. | 123/568 |
| 4,109,625 | 8/1978 | Kawamura et al. | 123/569 |
| 4,175,522 | 11/1979 | Kawamura et al. | 123/569 |

*Primary Examiner*—Wendell E. Burns
*Attorney, Agent, or Firm*—Robert J. Outland

[57] ABSTRACT

A divided chamber internal combustion engine is provided with means to recirculate combustion products from the engine precombustion or auxiliary combustion chamber to the intake prior to or during the main chamber exhaust process. The arrangement limits the exhaust of rich prechamber combustion products to the main chamber and exhaust system and instead recirculates them to the intake for subsequent recombustion and emission control purposes.

2 Claims, 2 Drawing Figures

DIVIDED CHAMBER ENGINE WITH PRECHAMBER EXHAUST RECIRCULATION

TECHNICAL FIELD

This invention relates to internal combustion engines and more particularly to divided chamber engines including both prechamber type diesel engines and auxiliary ignition chamber spark ignition engines. In its more particular aspects, the invention relates to emission control means for such engines.

BACKGROUND

Divided chamber engines which use an auxiliary or precombustion chamber to achieve combustion control or charge stratification have been produced in both diesel and spark ignition forms. Automotive type diesel engines commonly utilize unscavenged precombustion chambers while spark ignition engines have been built with both unscavenged auxiliary ignition or precombustion chambers and with ignition chambers that are scavenged by an auxiliary intake valve. In either case, fuel may be introduced into the auxiliary chamber with an injector or through the auxiliary intake valve if provided.

Combustion in the prechamber or auxiliary chamber of a divided chamber engine generally occurs at an airfuel ratio that is richer in fuel than the overall airfuel ratio for the engine. With spark ignition engines, this can mean that high levels of carbon monoxide or unburned hydrocarbons may be present in the prechamber combustion products. With diesel engines, higher than average levels of particulates may be present in the prechamber combustion products. During the exhaust blow-down process, cylinder pressure drops rapidly, allowing the auxiliary chamber combustion products to pass into the main combustion chamber and through the open exhaust valve to the engine exhaust system, adding to the level of emissions in the engine exhaust.

SUMMARY

The present invention provides an auxiliary exhaust valve and passage that connects the precombustion chamber or auxiliary chamber of a divided chamber engine with the engine intake system to recirculate the rich combustion products from the auxiliary chamber to the engine intake before or during the exhaust blow-down process. This recirculation reduces the amount of rich combustion products reaching the engine exhaust system and provides for their use in a subsequent combustion cycle for reburning and assisting in the control of nitrogen oxides formation.

These and other features and advantages of the invention will be more fully understood from the following description of a preferred embodiment taken together with the accompanying drawing.

BRIEF DRAWING DESCRIPTION

Figure 2:
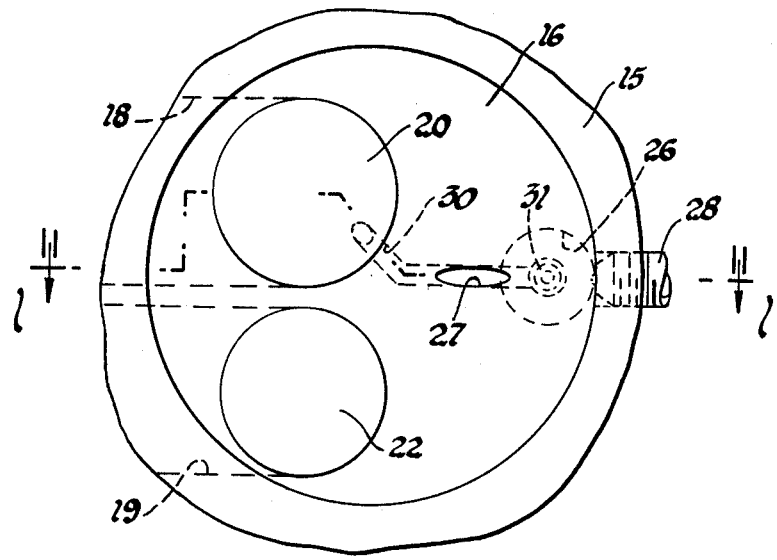

In the drawing:

FIG. 1 is a fragmentary cross-sectional view of a divided chamber engine as seen from the plane of the line 1—1 of FIG. 2 and having prechamber recirculation means according to the invention, and FIG. 2 is a view showing the main combustion chamber portion of the engine from the plane indicated by the line 2—2 of FIG. 1.

BEST MODE DISCLOSURE

Referring now to the drawing in detail, numeral 10 generally indicates a divided chamber internal combustion engine of the diesel type, although representing also, for present purposes, engines of the spark ignition auxiliary chamber type. Engine 10 conventionally includes a cylinder block 11 defining a cylinder 12 in which a piston 14 is reciprocably disposed for connection in conventional manner to the engine crankshaft, not shown.

A cylinder head 15 is mounted on the upper end of the cylinder block 11 and closes an end of the cylinder 12, defining with the piston a variable volume main combustion chamber 16. The main chamber 16 is connected with the usual intake and exhaust ports 18, 19 respectively, extending through the cylinder head and controlled by intake and exhaust poppet valves 20, 22 respectively. To control the intake and exhaust of gases to and from the main combustion chamber, a camshaft 23 and rocker arms 24 are provided for actuating the various intake and exhaust valves, which are closed in conventional fashion by valve springs, not shown.

The engine cylinder head 15 is also provided with a precombustion chamber (prechamber) 26, which is connected with the main combustion chamber 16 by a reduced area passage or throat 27. A fuel injector 28 mounted in the cylinder head extends into the prechamber 26 for the purpose of providing fuel thereto to form a combustible fuel-air mixture therein.

The portion of the engine so far described is representative of conventional precombustion chamber type diesel engines. However, the engine of the present invention differs from prior arrangements in that the cylinder head further includes an exhaust recirculation passage that connects the prechamber 26 with the cylinder intake port 18. Flow through the recirculation passage 30 is controlled by a poppet type auxiliary exhaust valve 31 which is actuated by a rocker arm 32 from the camshaft 23. Closing of the valve is conventionally accomplished by a valve spring, not shown.

In operation, movement of the engine piston and camshaft are conventionally related to provide a four-stroke cycle of engine operation. On the intake stroke, the intake valve 20 is opened and downward movement of the piston draws a charge of air from the intake port 18 into the main chamber 16. On the compression stroke, the valves are closed and the air charge is compressed into the main and auxiliary combustion (precombustion) chambers. Near the end of the compression stroke, fuel is injected into the prechamber 26 where it ignites spontaneously and burns, forcing some of the airfuel mixture out into the main chamber where further combustion takes place and the piston moves downwardly on the expansion stroke.

Near the bottom of the expansion stroke, the auxiliary exhaust valve 31 and the main exhaust valve 22 begin to open. If desired, the auxiliary exhaust valve may be opened slightly before the main exhaust valve. The opening movement of the valves allows pressurized gas in the auxiliary combustion chamber to pass through the recirculation passage 30 into the cylinder intake port 18 while the pressurized gas in the main combustion chamber is exhausted through the exhaust port 19. Subsequently, on the following intake stroke, the air charge drawn into the cylinder from the intake port will include a dilution charge of relatively rich combustion products recirculated to the intake port from the prechamber on the previous exhaust stroke, and the cycle is again repeated.

Provision of the prechamber exhaust recirculation passage 30 and valve 31 allows the relatively rich combustion products present in the precombustion chamber at the end of the expansion stroke to be recirculated to the intake rather than being expanded into the main combustion chamber and carried out with the exhaust gases through the exhaust port 19. Thus, the exhaust of particulate emissions and other products from the prechamber gases is reduced or avoided. These products are, instead, recirculated to the combustion chamber for reburning. The recirculated combustion products provide a diluent in the cylinder charge which aids in reducing the formation of nitrogen oxides in the combustion step.

While the foregoing description has had reference to a specific application of the invention to a diesel precombustion chamber type engine, it should be understood that the disclosed arrangement is equally applicable to spark ignition engines of the torch ignition or jet ignition auxiliary chamber type. Thus, it is within the scope of the invention to provide a recirculation passage and auxiliary exhaust valve in the auxiliary ignition chamber of divided chamber spark ignition engines wherein a rich mixture is formed within the auxiliary chamber which is connected to the main combustion chamber by a restricted passage or throat. Obviously, such arrangements of both spark ignition and compression ignition engines could take many forms including, but not limited to, that illustrated in the drawings and previously described.

Other changes or modifications in the described embodiment may also be made within the scope of the invention. For example, it may be desired to recirculate the prechamber gases of a diesel engine to the cylinder intake port but to remove the particulates from the recirculated gases before returning them to the engine cylinder. Thus, it is within the contemplated applications of the invention that the recirculation passage 30 could be connected to filter means for collecting particulates from the prechamber gases before passing them to the cylinder intake port. Alternatively, in multicylinder engines, the recirculation passages 30 could all be ducted to a single particulate filter, the outlet of which could be connected with the engine intake manifold or with the individual cylinder intake ports of the engine cylinders.

As these and other modifications may be made without departing from the spirit and scope of the inventive concepts described herein, it is intended that the invention not be limited to the disclosed embodiments but that it have the full scope provided by the language of the following claims.

The embodiments of the invention in which an exclusive property or privilege is claimed are defined as follows:

1. In a divided chamber internal combustion engine having an auxiliary combustion chamber capable of being charged with a combustible fuel-air mixture and connected by a restricted passage with a main combustion chamber having intake and exhaust means and capable of being charged with a relatively leaner charge than in the auxiliary chamber, the improvement comprising recirculation means connecting the auxiliary chamber with the intake means and operative during the operating cycle to recirculate at least a portion of combustion products from the auxiliary chamber to the intake means prior to completion of the exhaust of combustion products from the main chamber to thereby limit discharge in the exhaust of residual combustion products from the auxiliary combustion chamber.

2. In a prechamber type diesel engine having a precombustion chamber capable of being charged with air and having means to inject fuel to form in the chamber a combustible fuel-air mixture, said chamber being connected by a restricted passage with a main combustion chamber having intake and exhaust means and capable of being charged with air, the improvement comprising a recirculation passage connecting the precombustion chamber with the intake means and valve means controlling gas flow through said passage and operative during the operating cycle to recirculate at least a portion of combustion products through the passage from the precombustion chamber to the intake means prior to completion of the exhaust of combustion products from the main chamber to thereby limit discharge in the exhaust of residual combustion products from the precombustion chamber.

* * * * *